(12) United States Patent
Ward et al.

(10) Patent No.: US 6,994,500 B2
(45) Date of Patent: *Feb. 7, 2006

(54) SELF-ATTACHING NUT

(75) Inventors: Richard P. Ward, Canton, MI (US); Harold T. Woods, Flat Rock, MI (US); John J. Vrana, Rochester Hills, MI (US); John M. Parker, Ann Arbor, MI (US); Kerry V. Boggs, South Lyon, MI (US)

(73) Assignee: Whitesell International Corporation, Taylor, MI (US)

( * ) Notice: Subject to any disclaimer, the term of this patent is extended or adjusted under 35 U.S.C. 154(b) by 59 days.

This patent is subject to a terminal disclaimer.

(21) Appl. No.: 10/439,526

(22) Filed: May 16, 2003

(65) Prior Publication Data

US 2004/0042872 A1 Mar. 4, 2004

Related U.S. Application Data

(63) Continuation-in-part of application No. 10/232,335, filed on Aug. 30, 2002, now Pat. No. 6,851,904.

(51) Int. Cl.
*F16B 37/04* (2006.01)

(52) U.S. Cl. .................... 411/180; 411/179; 411/188

(58) Field of Classification Search ............... 44/180, 44/179, 184, 107, 187, 188; 429/432.2, 515, 429/512, 522

See application file for complete search history.

(56) References Cited

U.S. PATENT DOCUMENTS

| 1,919,552 A | 7/1933 | Hasselquist | |
| 3,213,914 A | 10/1965 | Baumle et al. | 151/41.72 |
| 3,253,631 A | 5/1966 | Reusser | 151/41.73 |
| 3,282,315 A | 11/1966 | Zahodiakin | 151/41.73 |
| 3,736,969 A | 6/1973 | Warn et al. | 151/41.73 |
| 3,810,291 A | 5/1974 | Ladouceur | 29/243.52 |
| 3,910,331 A | 10/1975 | Randall | 151/41.72 |
| 4,389,766 A | 6/1983 | Capuano | 29/432.2 |
| 4,432,681 A | 2/1984 | Capuano | 411/180 |
| 4,543,023 A | 9/1985 | Capuano | 411/180 |

(Continued)

FOREIGN PATENT DOCUMENTS

EP 0561715 A1 3/1993

OTHER PUBLICATIONS

RIMS Brochure (German).

(Continued)

*Primary Examiner*—Flemming Saether
(74) *Attorney, Agent, or Firm*—Howard & Howard

(57) ABSTRACT

A self-attaching nut having a central pilot projecting from an end face of the body portion, an annular groove surrounding the pilot and an annular panel support face surrounding the groove, wherein the outer side wall includes a plurality of circumferentially spaced notches, each having an outer wall which extends from the bottom wall of the annular groove to the panel support face and the bottom wall of the groove includes a plurality of circumferentially spaced radial ribs integral with either the outer or inner side walls of the annular groove having a radial end spaced from the opposed side wall and a top face inclined toward the bottom wall of the annular groove providing improved torque resistance and push-off strength. Alternating circumferentially overlapping radial ribs integral with the pilot and the outer groove wall and ribs which extend below the bottom wall of the groove are also disclosed.

12 Claims, 10 Drawing Sheets

U.S. PATENT DOCUMENTS

| | | | |
|---|---|---|---|
| 4,627,776 A | 12/1986 | Pamer et al. | 411/179 |
| 4,637,766 A | 1/1987 | Milliser | 411/180 |
| 4,708,556 A | 11/1987 | Pamer et al. | 411/179 |
| 4,810,143 A | 3/1989 | Muller | 411/181 |
| 4,893,976 A | 1/1990 | Milliser et al. | 411/180 |
| 4,911,592 A | 3/1990 | Muller | 411/181 |
| 5,244,326 A | 9/1993 | Henriksen | 411/366 |
| 5,251,370 A | 10/1993 | Muller et al. | 29/512 |
| 5,302,066 A | 4/1994 | Bieschke et al. | 411/181 |
| 5,335,411 A | 8/1994 | Muller et al. | 29/512 |
| 5,340,251 A | 8/1994 | Takahashi et al. | 411/179 |
| 5,423,645 A | 6/1995 | Muller et al. | 411/181 |
| 5,509,766 A | 4/1996 | Leuschner | 411/187 |
| 5,531,552 A | 7/1996 | Takahashi et al. | 411/179 |
| 5,549,430 A | 8/1996 | Takahashi et al. | 411/179 |
| 5,613,815 A | 3/1997 | Muller | 411/181 |
| 5,782,594 A | 7/1998 | Muller | 411/176 |
| 5,882,159 A | 3/1999 | Muller | 411/179 |
| 6,004,087 A | 12/1999 | Muller | 411/180 |
| 6,081,994 A | 7/2000 | Muller | 29/798 |
| 6,220,804 B1 | 4/2001 | Pamer et al. | 411/180 |
| 6,257,814 B1 | 7/2001 | Muller | 411/176 |
| 6,276,040 B1 | 8/2001 | Muller | 29/432.2 |
| D457,054 S | 5/2002 | Pamer et al. | D8/397 |
| 6,409,444 B2 | 6/2002 | Pamer et al. | 411/180 |
| 6,543,979 B2 | 4/2003 | Iwatsuki | 411/180 |
| 2001/0010789 A1 | 8/2001 | Pamer et al. | 411/179 |
| 2002/0159858 A1 | 10/2002 | Ikami et al. | 411/181 |
| 2002/0172573 A1 | 11/2002 | Pamer et al. | 411/337 |
| 2002/0182032 A1 | 12/2002 | Anderson et al. | 411/533 |

OTHER PUBLICATIONS

RIMS Brochure (English).

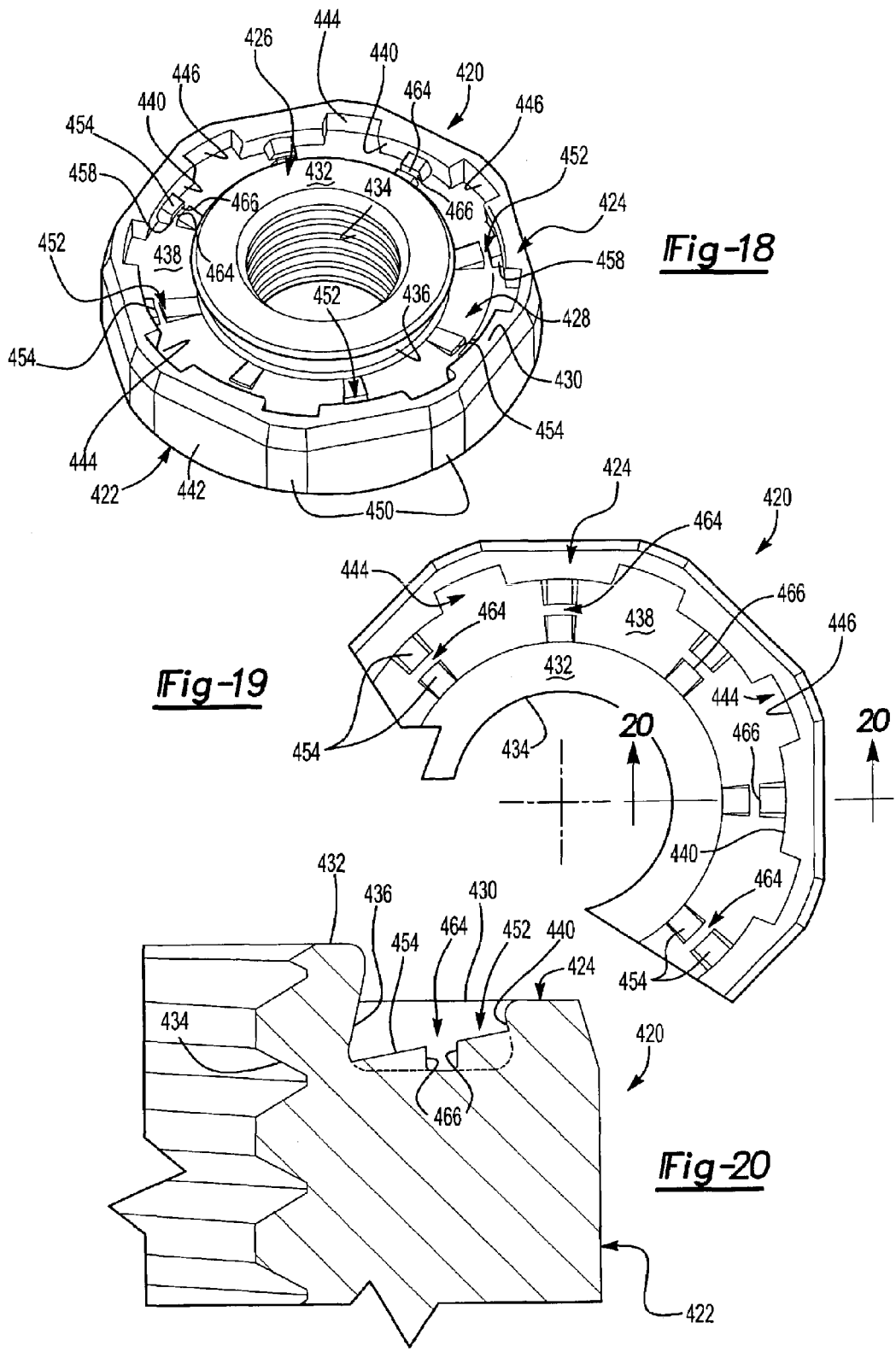

SELF-ATTACHING NUT

RELATED APPLICATIONS

This application is a continuation-in-part application of U.S. Ser. No. 10/232,335 filed Aug. 30, 2002 now U.S. Pat. No. 6,851,904.

FIELD OF THE INVENTION

This invention relates to self-attaching female fasteners, particularly including pierce and clinch nuts, which may be formed by conventional cold header techniques including secondary operations and which provide improved retention and resistance to rotation of the fastener on a panel following installation.

BACKGROUND OF THE INVENTION

Self-attaching female fasteners, including pierce and clinch nuts, formed by cold header techniques and secondary press operations generally include a body portion having an end face, a central pilot portion projecting from the end face of the body portion having a bore through the central pilot portion, an annular groove in the end face of the body portion surrounding the pilot portion and an annular panel support face or flange portion surrounding the annular groove. Generally, at least one of the inner and outer side walls of the annular groove are inclined toward the other side wall to provide a restricted opening to the annular groove adjacent the annular panel support face to improve retention of the fastener following installation. Further improved retention of the fastener on a panel is provided by inclining both the inner and outer side walls of the annular groove toward the opposing side wall forming a "dovetail" shaped re-entrant groove. When the panel is deformed against the bottom wall of the groove by a die member or die button having a projecting annular lip configured to be received in the annular groove, the panel is simultaneously deformed beneath the undercuts provided by the dovetail shaped re-entrant groove. Alternatively, the outer side wall of the annular groove may be inclined toward the pilot portion and the pilot portion may be deformed radially outwardly during installation as disclosed, for example, in U.S. Pat. No. 6,276,040 to form a secure installation having sufficient push-off strength. However, most installations of self-attaching nuts also require sufficient torque resistance or anti-rotation means preventing rotation of the self-attaching fastener on the panel following installation, particularly where the nut and panel assembly is attached to a second component by a bolt or other male threaded member using a torque wrench or the like.

The, prior art discloses various anti-rotation or torque resistant means for self-attaching female fasteners of this type. For example, U.S. Pat. No. 5,531,552, assigned to the predecessor in interest of this application, discloses forming a plurality of circumferentially spaced protrusions having radial channels therebetween in the bottom wall of the groove which provides improved torque resistance. U.S. Pat. No. 5,549,430, also assigned to the predecessor in interest of the assignee of this application, discloses a self-attaching nut of this type, wherein the bottom wall of the groove includes a plurality of spaced arcuate or semi-circular protrusions integral with the pilot portion which provide improved torque resistance, but which also deforms panel metal beneath the inclined outer side wall of the annular groove, also providing improved push-off strength following installation. U.S. Pat. No. 5,782,594 discloses a pierce nut having a central recess, rather than a groove having an inner side wall and a plurality of circumferentially spaced radial notches or pockets formed in the panel support face which, when formed by a die member, forms radially inwardly projecting bead-like projections in the side wall of the recess, providing improved torque resistance. The above-referenced U.S. Pat. No. 6,276,040, also discloses opposed V-shaped webs integral with the bottom wall of a dovetail shaped annular groove and the opposed inner and outer side walls of the annular groove. Further, the prior art includes pierce nuts of this type having rectangular radial ribs or lugs which bridge the bottom wall of the annular groove and are integral with both the inner and outer side walls of the groove. However, where the ribs are integral with both the inner and outer side walls of the annular groove, deformation of a panel against the ribs may cause deformation or distortion of the thread cylinder unless the pilot is reinforced.

However, many applications of self-attaching nuts of this type formed by cold heading require further improved integrity of the nut and panel assembly, including improved torsion resistance and push-off strength. The embodiments of the improved self-attaching nut of this invention provides improved integrity of the nut and panel assembly, including improved torsion resistance and push-off strength.

SUMMARY OF THE INVENTION

The self-attaching nut or female fastener element of this invention may be formed by conventional cold header techniques and may be utilized as a pierce or clinch nut to provide superior integrity in a fastener and panel assembly, including improved torsion resistance and push-off strength. As used herein, the term "self-attaching nut," includes both pierce and clinch nuts. During installation of a pierce nut, the central pilot portion pierces or punches an opening in the panel and the panel is then deformed into the annular groove by a die member or die button. A clinch nut is installed in a preformed panel opening, but a pierce nut may also be utilized as a clinch nut. The self-attaching nut of this invention includes a body portion having an end face, a central pilot portion projecting from the end face having a bore therethrough, an annular groove in the end face surrounding the pilot and an annular panel support face or flange portion surrounding the annular groove. The annular groove includes an inner side wall adjacent the pilot portion, a bottom wall and an outer side wall extending from the bottom wall to the panel support face. In the preferred embodiments of the self-attaching nut of this invention, at least one of the inner and outer side walls of the annular groove is inclined toward the other side wall forming a restricted opening to the annular groove. In a preferred embodiment of the self-attaching nut of this invention, the outer side wall of the annular groove is inclined toward the pilot portion and in the most preferred embodiment, both side walls of the groove are inclined to the other side wall, forming a dovetail-shaped re-entrant groove, wherein the outer side wall is inclined toward the pilot portion and the inner side wall is inclined toward the outer side wall providing improved push-off strength. However, as set forth above, the prior art includes self-attaching nuts having the features thus far described.

As set forth below, this application discloses several embodiments of the self-attaching nut of this invention having improved torque resistance. The improvements described below may be utilized in various combinations to provide improved torque resistance and push-off strength depending upon the application.

One feature of the self-attaching nut of this invention is that the outer side wall of the annular groove includes a plurality of circumferentially spaced radial notches each having an outer side wall and opposed generally radial walls. In a preferred embodiment, the notches extend from the bottom wall of the annular groove to the annular panel support face. During installation of the self-attaching nut to a panel, the panel is deformed radially into the radial notches providing improved torque resistance. In a preferred embodiment, wherein the outer side wall of the annular groove is inclined radially inwardly toward the pilot portion, the outer wall of the notches may extend generally or substantially perpendicular to the annular support face of the self-attaching nut.

Further improvement in torque resistance may be provided by radial ribs projecting from the bottom wall of the annular groove each having a top face spaced from the bottom wall. In one preferred embodiment, the radial ribs are integral with the outer side wall of the annular groove at or above a midportion of the outer side wall and the top face of the ribs is inclined from the outer side wall toward the bottom wall of the annular groove but spaced from the inclined inner side wall of the annular groove, thereby providing improved torque resistance, but also deforming the panel beneath the inclined inner side wall and providing improved push-off strength. In one preferred embodiment, the radial inner ends of the radial ribs merge with the bottom wall flush with the bottom wall. In another preferred embodiment, the radial ribs continue "beneath" the bottom wall of the bottom wall in radial channels, such that the top face of the radial ribs extends below the plane of the bottom wall providing further improved torque resistance.

In the disclosed embodiments, the radial ribs may be generally rectangular in cross-section having a planar top face, but preferably include outwardly inclined side faces which direct panel metal into the bottom wall of the groove. In one preferred embodiment, the radial ribs are integral with the inwardly inclined outer side wall of the annular groove and spaced between the radial notches. In another preferred embodiment, the radial ribs are integral with the outer wall of the radial notches, but preferably have a width measured circumferentially less than the circumferential width of the radial notches, such that panel metal will flow around the radial ribs into the radial notches. As used herein, the phrase "integral with the outer side wall" of the annular groove includes radial ribs integral with either the inclined outer side wall of the annular groove, when used, or the outer wall of the radial notches, because the outer wall of the radial notches, when used, further define the outer side wall of the annular groove. In another preferred embodiment, the radial ribs are integral with the inner side wall of the annular groove, are inclined toward the bottom wall and spaced from the outer wall as described above with regard to the preferred embodiments wherein the radial ribs are integral with the outer side wall. In this embodiment, the top face of the radial ribs may extend radially beneath the plane of the bottom wall of the annular groove in a radial channel, as described above.

Further improvement in torque resistance may be provided by cooperation of the radial ribs. In one preferred embodiment, a pair of radial ribs is provided in a plurality of the radial notches integral with the outer wall of the radial notches, wherein the opposed radial ribs each include a top face which may extend to the panel support face surrounding the annular groove, opposed outwardly inclined faces, which are angled toward the opposed face of the adjacent radial rib, directing panel metal between the ribs and preferably including inwardly inclined faces forming an undercut between the pair of ribs providing further improved push-off strength and torque resistance. In another embodiment, the circumferentially spaced radial ribs comprise alternating radial ribs integral with the inner side wall or pilot portion and the outer side wall, wherein the radial ribs have a radial length greater than one-half the radial width of the bottom wall of the annular groove, such that the ribs overlap circumferentially providing further improved torque resistance. In this embodiment, the radial ribs are inclined toward the bottom wall, but spaced from the opposed wall, such that, during installation, panel metal is deformed radially outwardly by the ribs integral with the inner wall of the annular groove beneath the inclined outer wall and radially inwardly beneath the inclined inner side wall by the radial ribs integral with the outer side wall.

Further improved push-off strength is provided by radial ribs integral with either the inner or outer side wall of the annular groove having an end portion spaced from the other side wall above the plane of the bottom wall and an inwardly inclined end face integral with the bottom wall forming an undercut and entrapping panel metal during installation. As will be understood from the above description, in the preferred embodiments of the self-attaching nut of this invention, the radial ribs are integral with one of the inner and outer side walls of the annular groove each having an end portion spaced from the opposed side wall and the radial ribs preferably include a top face which is angled toward the bottom wall. However, a similar effect may be provided by a radial rib integral with either the inner or outer side wall, angled toward the bottom wall, wherein the radial end portion is adjacent the opposed inner or outer side wall and including a circumferential channel.

As will be understood from the above summary of the invention, several embodiments of the self-attaching nut of this invention are disclosed herein which include improved integrity when installed in a panel, including push-off strength and torque resistance. Further advantages and meritorious features of the self-attaching nut of this invention will be more fully understood from the following description of the preferred embodiments, the appended claims and the drawings, a brief description of which follows.

BRIEF DESCRIPTION OF THE DRAWINGS

FIG. 18 is a top perspective view of a further alternative embodiment of this invention;

FIG. 19 is a partial top view of the embodiment of the self-attaching nut shown in FIG. 18;

FIG. 20 is a partial cross-sectional view of FIG. 19 in the direction of view arrows 20—20;

DESCRIPTION OF THE PREFERRED EMBODIMENTS

Figure 1:
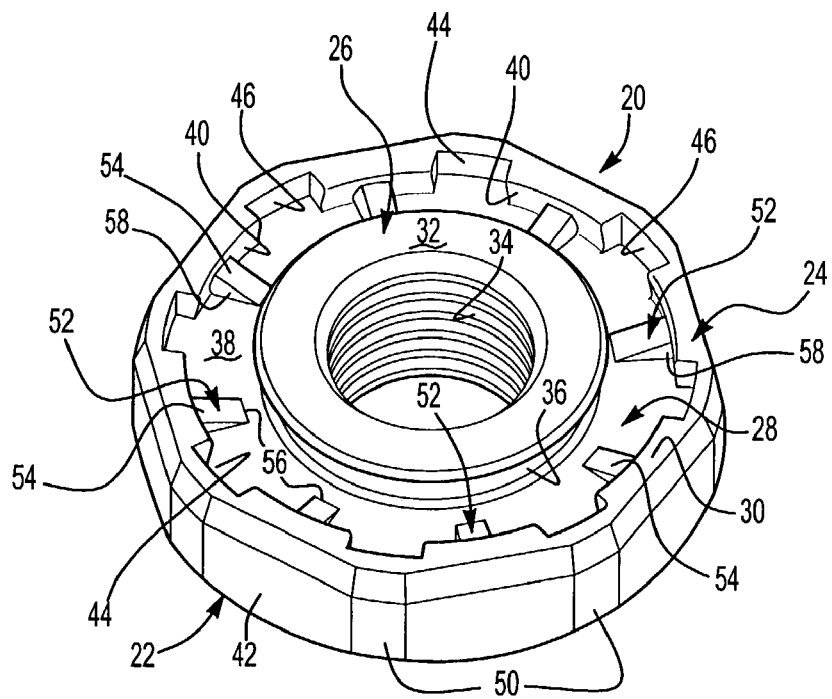
FIG. 1 is a top perspective view of one embodiment of the self-attaching nut of this invention.

As will be understood, the following description of the preferred embodiments and the appended drawings are for illustration purposes only and do not limit the scope of this invention except as set forth in the following claims. FIGS. 1 to 5 illustrate a first embodiment of the self-attaching nut 20 of this invention including a body portion 22 having an end face 24 (see FIG. 1), a central pilot portion 26, an annular groove 28 surrounding the pilot portion 26 and an annular panel support face 30 surrounding the annular groove 28. The pilot portion 26 includes an annular preferably planar end face 32 and a bore 34 through the pilot portion. Where the self-attaching nut 20 of this invention is utilized as a pierce nut, the end face 32 is preferably above the plane of the annular panel support face 30, as best shown in FIG. 3, such that the pilot portion 26 pierces an opening in a metal panel as is well known in this art. As best shown in FIG. 3A, the annular groove 28 includes an inner side wall 36 which, in the disclosed embodiment, is also the outer side wall of the pilot portion 26, a bottom wall 38 and an outer side wall 40. As set forth above, in the preferred embodiments of the self-attaching nuts of this invention, at least one of the inner and outer side walls 36 and 40, respectively, is inclined toward the opposed side wall forming a restricted opening to the annular groove 28. In a preferred embodiment of this invention, the outer side wall 40 is inclined toward the pilot portion 26 or more specifically toward the inner side wall 36 and in the most preferred embodiment, the inner and outer side walls 36 and 40 are inclined toward each other as shown in FIG. 3A, forming a dovetail-shaped re-entrant groove providing improved push-off strength when the self-attaching nut is installed in a panel (not shown). The bore 34 may be threaded as shown or the bore 34 may be cylindrical for receipt of a thread forming or thread rolling male fastener, such as a screw or bolt. The body portion 22 may be polygonal as shown having a plurality of flat faces 42 or the outer surface of the self-attaching nut may also be cylindrical. As thus far described, the self-attaching nut of this invention is generally conventional, although several of the prior art references do not include both an inner and outer inclined side wall 36 and 40, respectively, which results in reduced push-off strength.

As set forth above, the self-attaching nut of this invention provides improved integrity of the nut and panel assembly, including improved torque resistance and push-off strength. One important feature of the self-attaching nut shown in FIGS. 1 to 5 is the circumferentially spaced radial notches 44 each having an outer wall 46 and opposed generally radial walls 48. The radial walls 48 may also be inclined inwardly toward each other from the outer wall 46 (not shown) to provide further torque resistance. As best shown in FIG. 3, the outer wall 48 of the radial notches extends generally perpendicular to the panel planar support face 30 in the disclosed embodiment. Further, in a preferred embodiment, the radial notches 44 extend from the bottom wall 38 of the annular groove 28 to the top annular panel support face 30. As will be understood, during installation of the self-attaching nut 20, a panel (not shown) will be deformed into the radial notches 44 providing substantially improved torque resistance. In the disclosed embodiment, the self-attaching nut 20 includes eight radial notches 44 and the body portion includes eight flats 42, wherein the radial notches 44 are defined in the corner portions 50 (see FIG. 1), providing maximum torque resistance.

Figure 2:
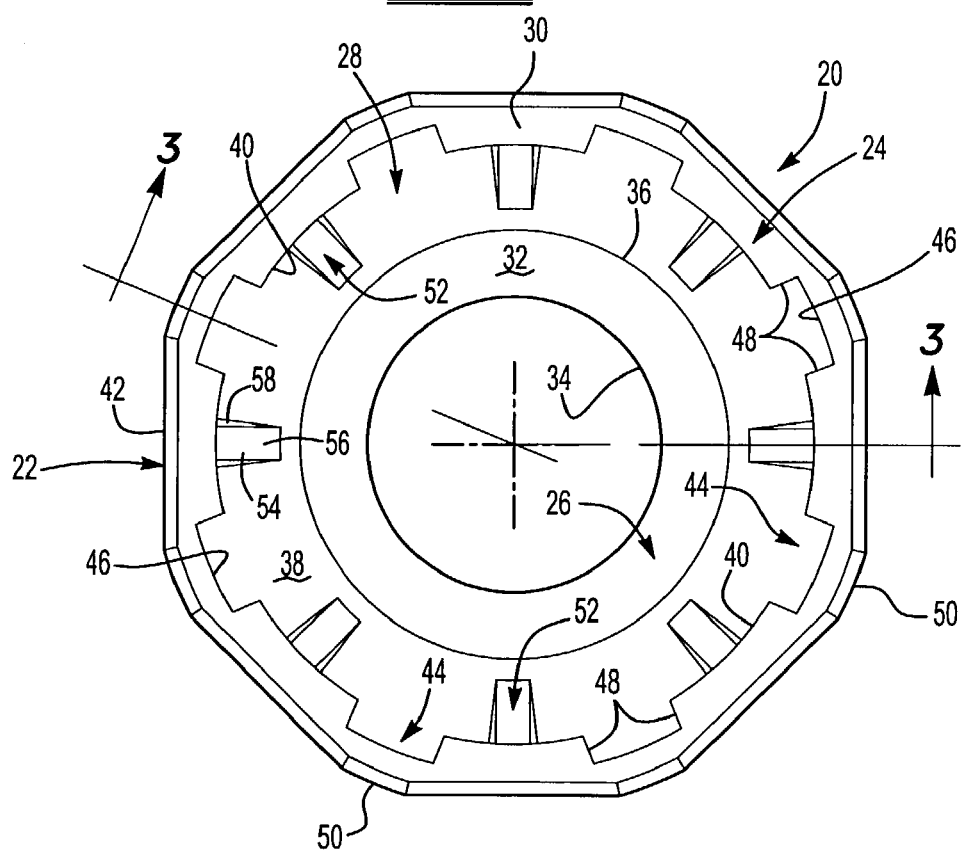
FIG. 2 is a top view of the self-attaching nut shown in FIG. 1.
Figure 3:
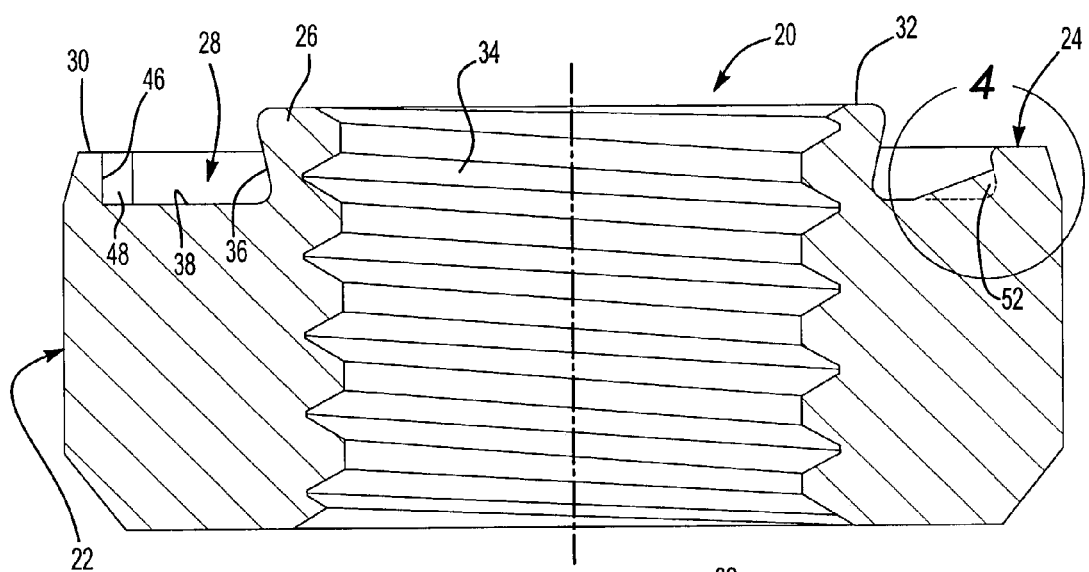
FIG. 3 is a side cross-sectional view of FIG. 2 in the direction of view arrows 3—3.
Figure 3A:
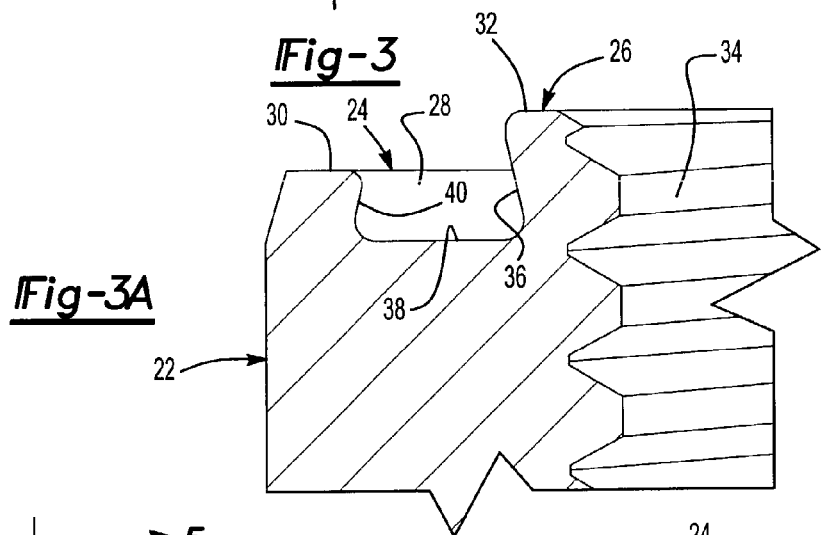
FIG. 3A is an enlarged cross-sectional view of the annular groove in the embodiment of the self-attaching nut shown in FIGS. 1 to 3.
Figure 4:
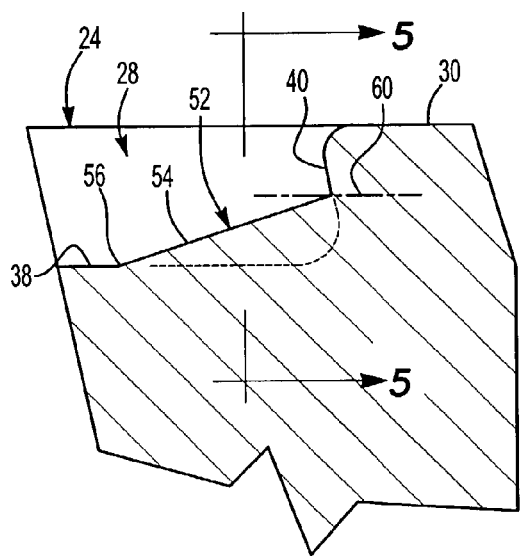
FIG. 4 is an enlarged cross-sectional view of FIG. 3 in the area of view circle 4.
Figure 5:
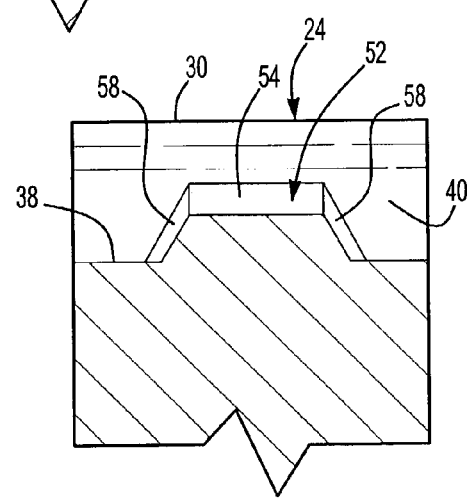
FIG. 5 is a partial cross-sectional view of FIG. 4 in the direction of view arrows 5—5.
Figure 6:
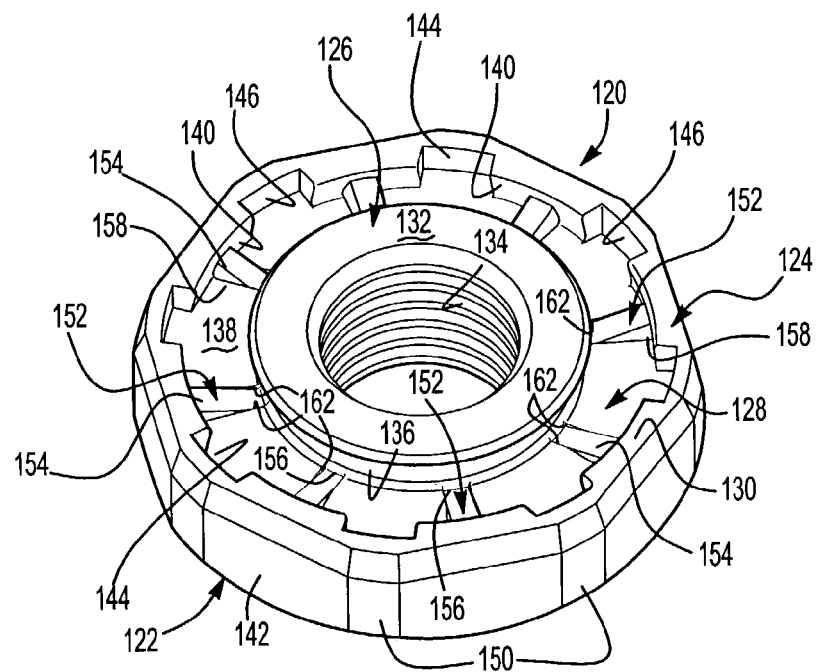
FIG. 6 is a top perspective view of an alternative embodiment of the self-attaching nut of this invention.
Figure 7:
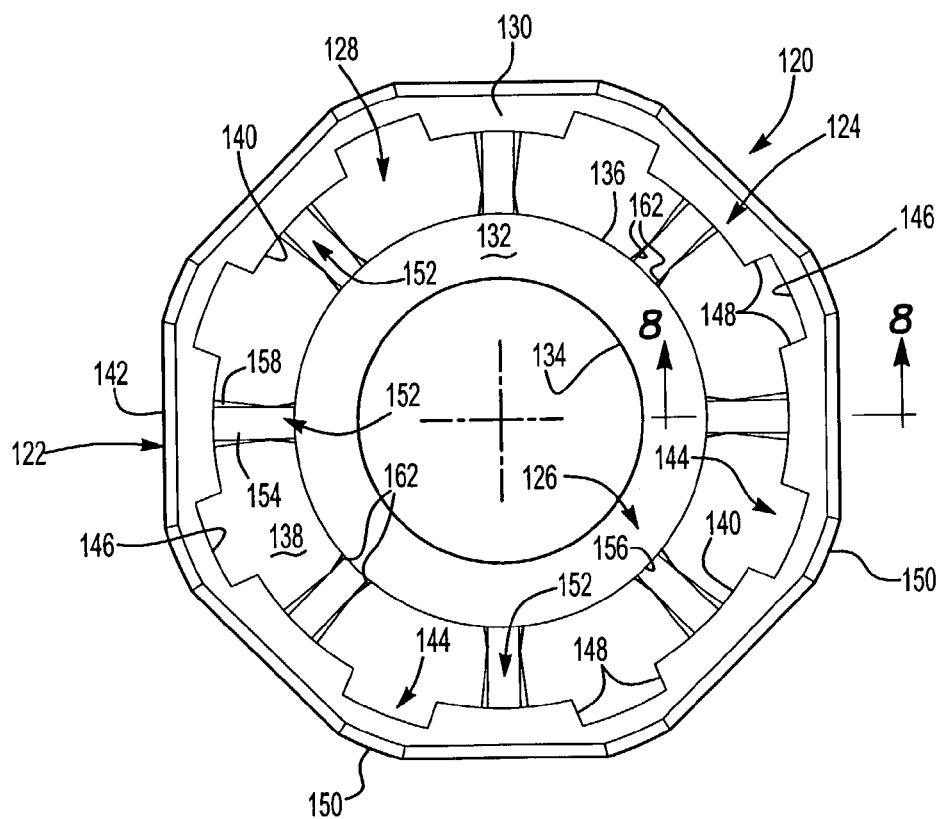
FIG. 7 is a top view of the self-attaching nut shown in FIG. 6.

Although the radial notches 44 may be used alone to provide torque resistance, the embodiment of the self-attaching nut 20 illustrated in FIGS. 1 to 5 further includes a plurality of radial ribs 52. In this embodiment of the self-attaching nut 20 of this invention, the radial ribs 52 are integral with the inclined outer side wall 40 of the annular groove 28. Each of the radial ribs 52 include a top face 54 which is inclined from the outer side wall 40 of the annular groove 28 toward the bottom wall 38. In the disclosed embodiment of the self-attaching nut 20, the radial inner ends 56 of the radial ribs 52 merge with the bottom wall 38 as best shown in FIG. 4 and the radial inner ends 56 of the ribs 52 are spaced from the inner side wall 36 of the annular groove 28 as best shown in FIGS. 1 and 2. In the disclosed embodiment, the top face 54 of the radial ribs 52 is generally rectangular; however, the side faces 58 of the radial ribs are preferably angled outwardly as best shown in FIG. 5. The outwardly inclined faces 58 direct panel metal toward the bottom wall 38 of the annular groove 28, improving filling of the annular groove 28 with panel metal during installation. Further, the inclined top faces 54 of the radial ribs 52 direct panel metal radially inwardly beneath the inclined inner side wall 36 as the panel metal is deformed against the radial ribs 52, providing further improved torsion resistance and push-off strength.

As will be understood by those skilled in this art and described further in the above-referenced U.S. patents, the self-attaching nut 20 illustrated in FIGS. 1 to 5 may be utilized as a pierce nut, wherein the planar annular end face 32 of the central pilot portion 26 is driven against a panel (not shown) which is supported on a die button (not shown) and the pilot portion then pierces an opening in the panel which receives the pilot portion 26 therethrough. The die button will include an annular lip configured to be received within the annular groove 28 which deforms the panel surrounding the panel opening into the annular groove 28 and against the bottom wall 38 and the top faces 54 of the radial ribs 52. The inclined top face 54 of the radial ribs then directs panel metal beneath the inclined inner side wall 36, providing improved retention and the panel metal is further deformed around the inclined side faces 58 of the radial ribs and into the radial notches 44 providing further improved torque resistance. In a preferred embodiment, the inclined top face 54 is spaced below the annular panel support face 30 and integral with the inclined outer side wall 40 at or above the midportion 60 (i.e., about one half the distance between the bottom wall 38 and the panel support face 30) of the inclined outer side wall 40 as shown in FIG. 4, providing optimum torque resistance. As will now be understood, the radial notches 44 in combination with the radial ribs 52 provide superior torque resistance and further improve the push-off strength or integrity of the nut and panel installation.

Figure 8:
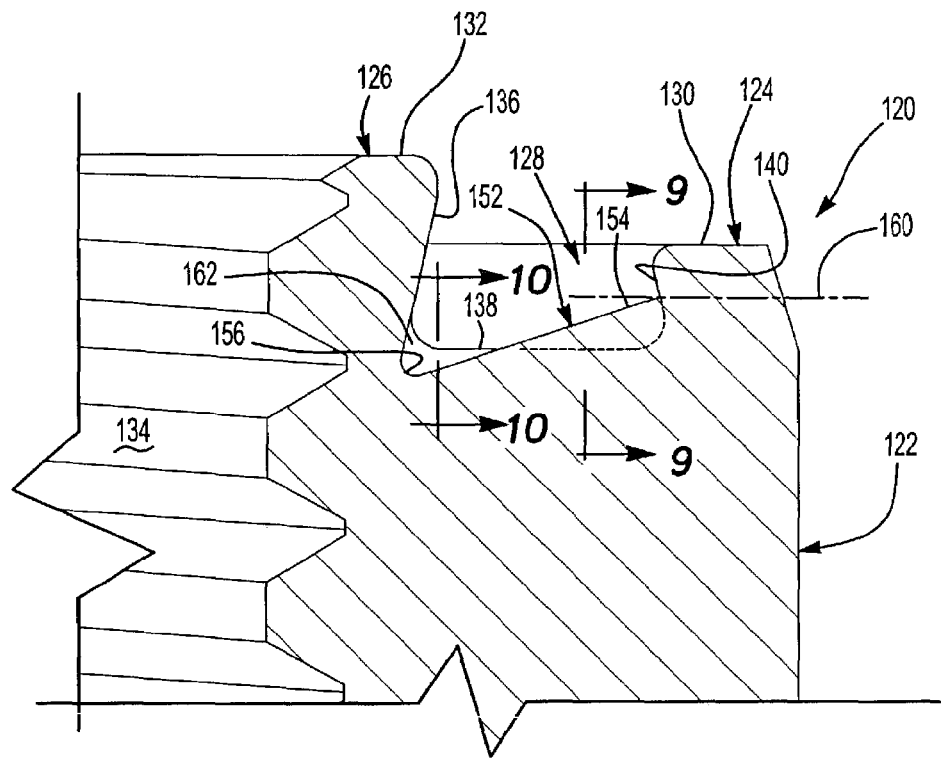
FIG. 8 is a partial side cross-sectional view of FIG. 7 in the direction of view arrows 8—8.
Figures 9, 10:
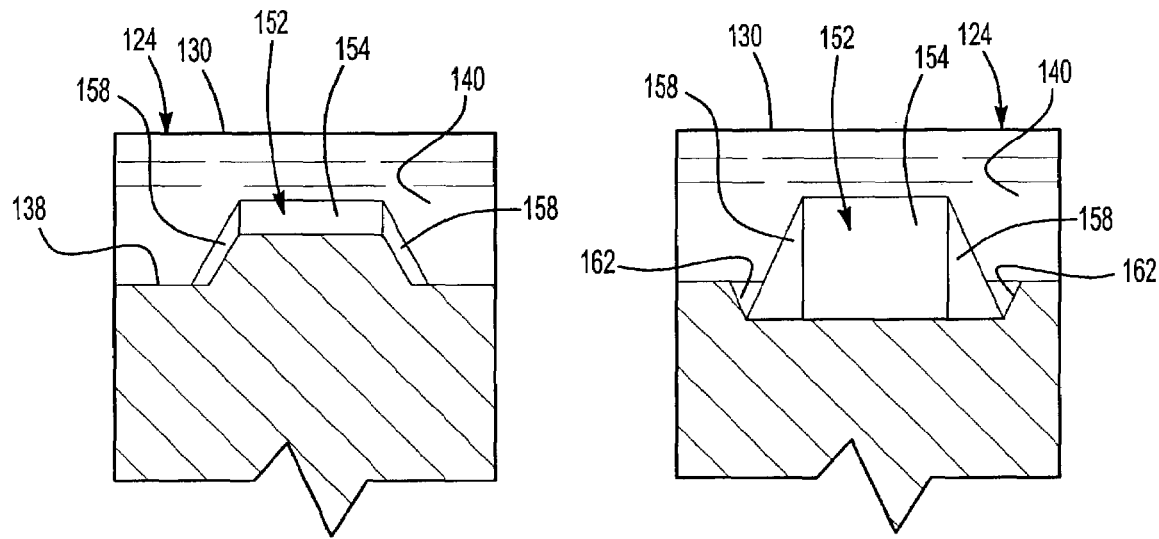
FIG. 9 is a partial cross-sectional view of FIG. 8 in the direction of view arrows 9—9.
FIG. 10 is a partial cross-sectional view of FIG. 8 in the direction of view arrows 10—10.
Figure 11:
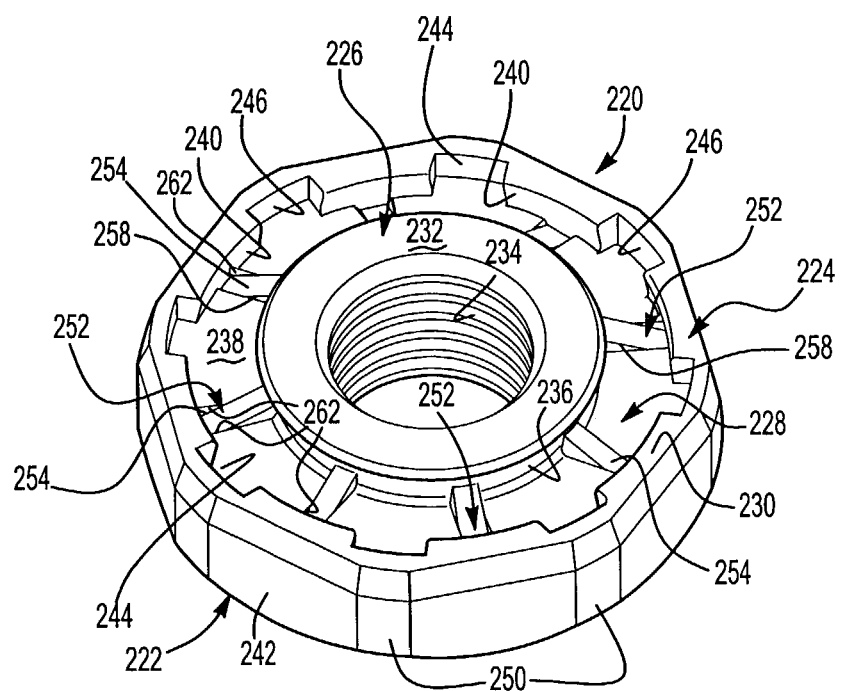
FIG. 11 is a top perspective view of a further alternative embodiment of the self-attaching nut of this invention.
Figure 12:
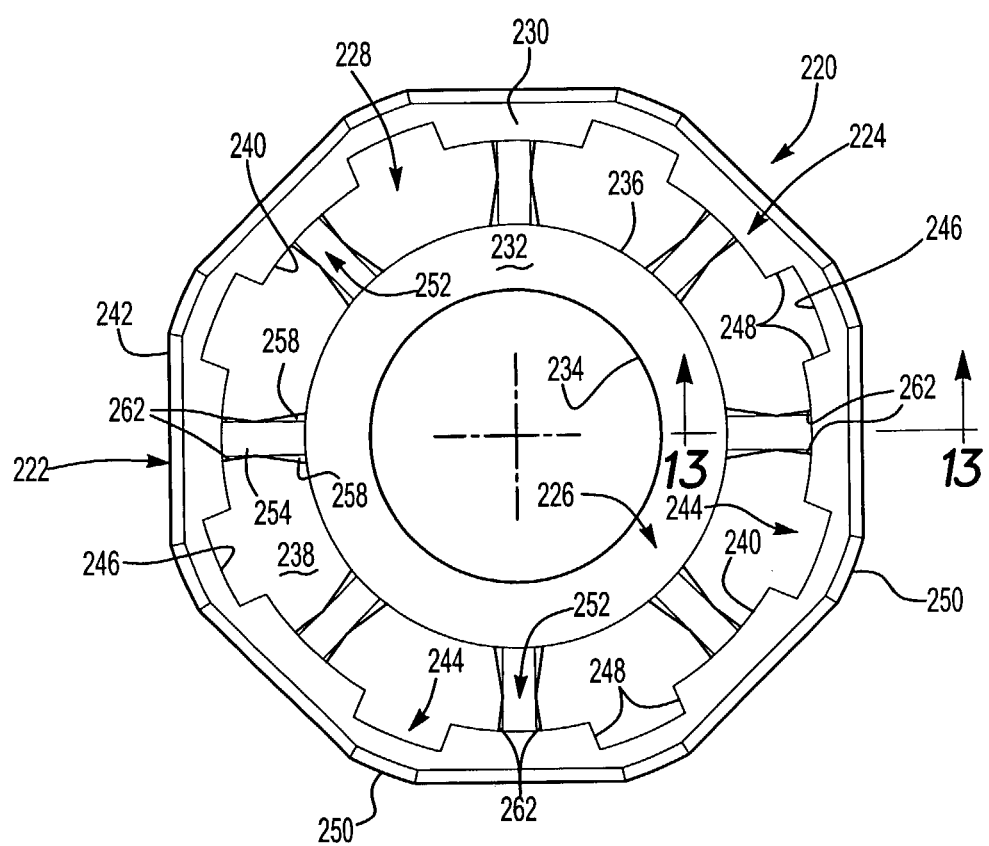
FIG. 12 is a top view of the self-attaching nut shown in FIG. 11.
Figure 13:
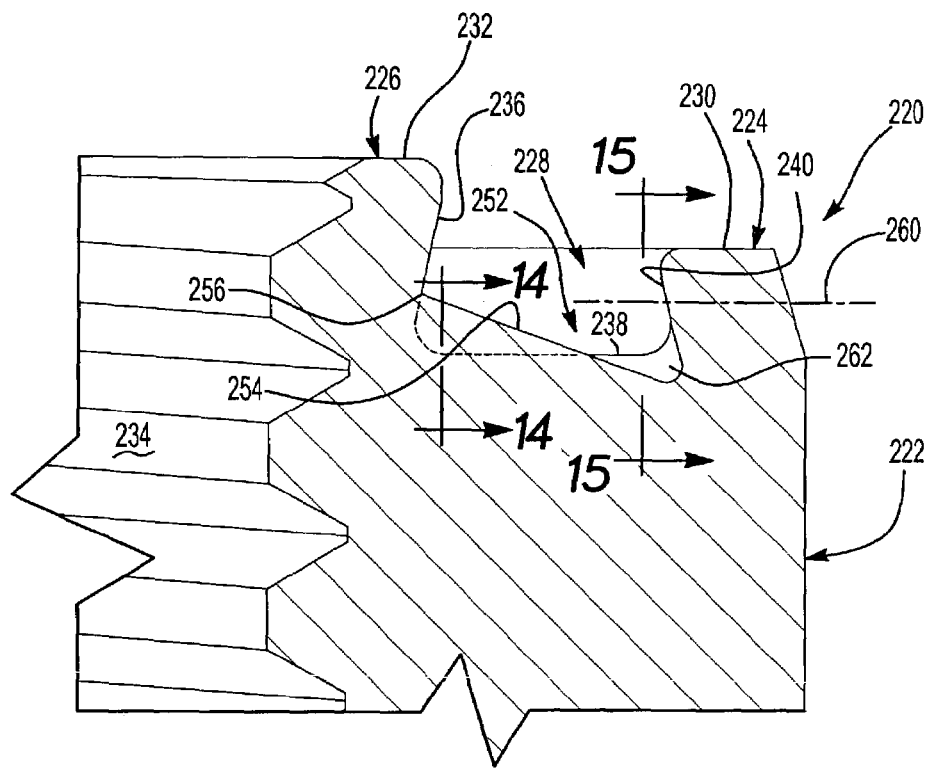
FIG. 13 is a partial side cross-sectional view of FIG. 12 in the direction of view arrows 13—13.
Figures 14, 15:
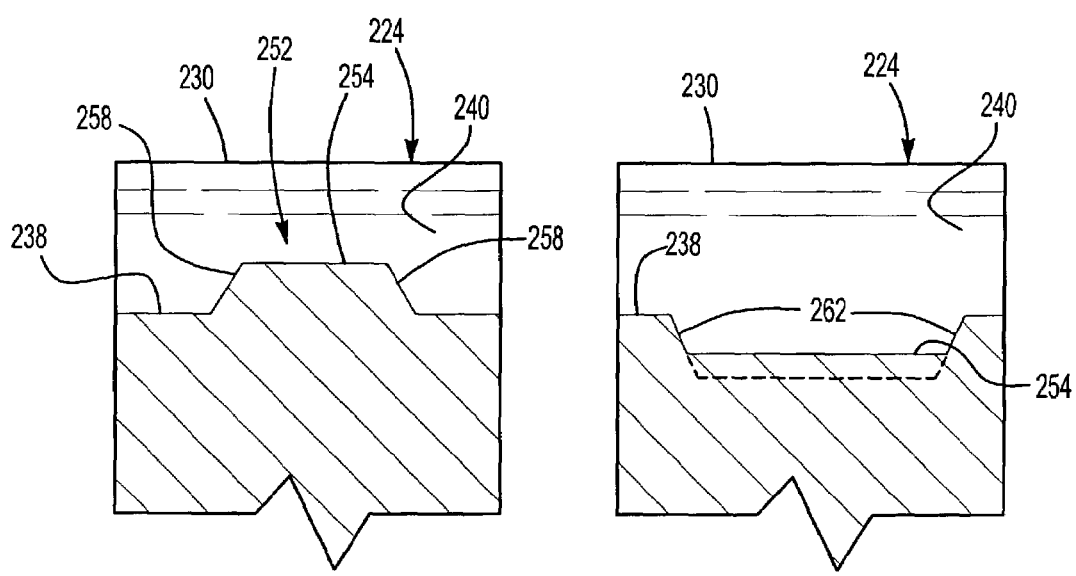
FIG. 14 is a partial cross-sectional view of FIG. 13 in the direction of view arrows 14—14.
FIG. 15 is a partial cross-sectional view of FIG. 13 in the direction of view arrows 15—15.

FIGS. 6 to 10 illustrate a second embodiment of a self-attaching nut 120 of this invention, wherein the common elements of the self-attaching nut 120 are numbered the same as the elements of the self-attaching nut 20 described above except that the elements of the self-attaching nut 120 are numbered in the 100 series to simplify the description of the self-attaching nut 120. That is, the self-attaching nut 120 shown in FIGS. 5 to 10 include a body portion 122 having an end face 124, a central pilot portion 126, an annular groove 128 surrounding the pilot portion and an annular panel support face 130 surrounding the annular groove 128. In this embodiment of the self-attaching nut 120, the radial ribs 152 are integral with the inclined outer side wall 140, generally equally spaced between the radial notches 144, as described above in regard to the self-attaching nut 20 shown in FIGS. 1 to 5. However, the top face 154 of the radial ribs extends below the plane of the bottom wall 138 of the annular groove 128, as best shown in FIG. 8, wherein the radial inner end portion 156 of each of the radial ribs 152 is received in a radial channel 162 as shown in FIGS. 8 and 10. The radial inner end 156 of the radial ribs 152 is, however, spaced from the inner side wall 136 of the annular groove in that it is not integral with the outer wall of the pilot portion or the inclined inner wall 136 of the annular groove. All other features of the self-attaching nut 120 may be identical to the self-attaching nut 20 described above with regard to FIGS. 1 to 5.

The second embodiment of the self-attaching nut 120 shown in FIGS. 6 to 10 has further advantages over the self-attaching nut 20 shown in FIGS. 1 to 5. First, during installation of the self-attaching nut 120 in a panel (not shown), the panel metal will be driven against the inclined top face 154 into the radial channels 162 in the bottom wall 138 of the annular groove 128, providing further improved torque resistance. Further, the panel will be driven beneath the inclined inner side wall 136 by the inclined radial top face 154 which extends to adjacent the inclined inner side wall 136, providing further improved push-off strength. The remaining features of the second embodiment of the self-attaching nut shown in FIGS. 6 to 10 may be identical to the self-attaching nut 20 described in more detail above, and therefore no further description of the second embodiment is necessary for a full understanding of this embodiment.

The third embodiment of the self-attaching nut 220 shown in FIGS. 11 to 15 is essentially identical to the second embodiment shown in FIGS. 6 to 10, except that the radial ribs 252 are integral with the inner side wall 236 of the annular groove 228 which, in the disclosed embodiment, is also the external surface of the central pilot portion 226. That is, the self-attaching nut 220 includes a central pilot portion 226, an annular groove 228 surrounding the pilot portion and an annular panel support face 230 surrounding the annular groove 228. Except as described above, the self-attaching nut 220 is identical to the self-attaching nut 120 described above and the elements of the self-attaching nut 220 are numbered the same as the elements of the self-attaching nut 120 except that the reference numbers of this third embodiment are numbered in the 200 series.

In this third embodiment of the self-attaching nut 220, panel metal is driven against the bottom wall 238 of the annular groove 228 and the outwardly inclined top faces 254 of the radial ribs 252 during installation of the self-attaching nut in a panel (not shown). The panel metal is thus driven beneath the inclined outer side wall 240 and into the radial channels 262 by the inclined top faces 254, providing a very secure installation with improved torque resistance as described above with regard to the self-attaching nut 120. Further, as described above with regard to the self-attaching nut 20, the panel metal is simultaneously driven into the radial notches 244 in the outer side wall 240. Further, in this third embodiment, there is less likelihood of distortion of the threaded bore 234 because the radial ribs 252 do not drive panel metal toward the pilot portion 226. As set forth above, all other elements or features of the self-attaching nut 220 may be identical to the self-attaching nuts 20 and 120 described above and therefore, no further description of this embodiment is required for a full understanding of this embodiment.

Figure 16:
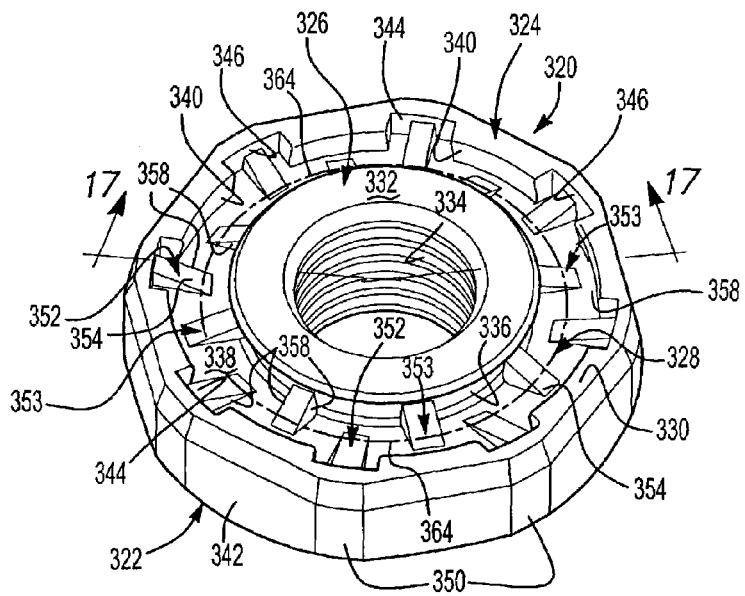
FIG. 16 is a top perspective view of a further alternative embodiment of the self-attaching nut of this invention.
Figure 17:
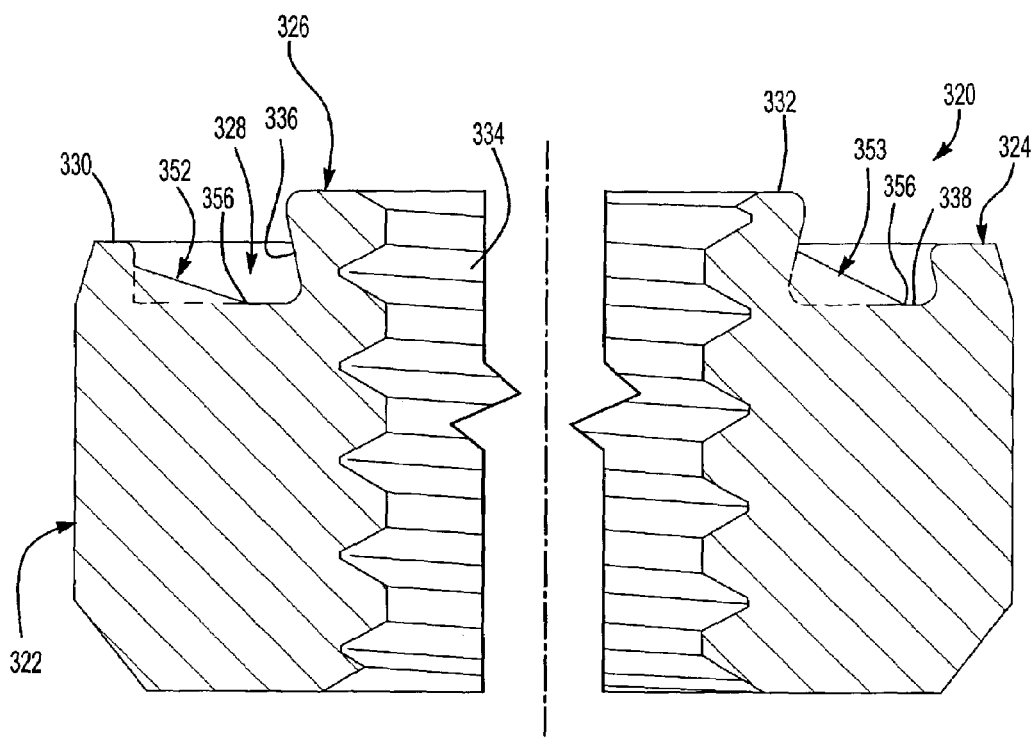
FIG. 17 is a partial side cross-sectional view of FIG. 16 in the direction of view arrows 17—17.

The fourth embodiment of the self-attaching nut 320 shown in FIGS. 16 and 17 differs from the embodiment of the self-attaching nut 20 shown in FIGS. 1 to 5 in two material respects. First, the bottom wall 338 of the annular groove 328 includes a plurality of alternating circumferentially spaced ribs 352 and 353, including a first plurality of circumferentially spaced radial ribs 352 integral with the outer side wall of the annular groove 328 and a second plurality of radial ribs 353 integral with the inner side wall 336 of the annular groove 328. In a preferred embodiment of the self-attaching nut 320, the radial ends 356 of the radial ribs 352 and 353 extend beyond a midportion 364 of the annular groove 328, such that the alternating radial ribs 352 and 353 circumferentially "overlap." That is, the radial inner ends 356 of the radial ribs 352 extend beyond the radial inner ends 356 of the radial ribs 353 in the bottom wall 338 of the annular groove 328, such that the radial ribs 352 and 353 circumferentially overlap, as best shown in FIG. 16. This alternately overlapping radial ribs 352 and 353 provide superior torque resistance. Further, upon installation of the self-attaching nut 320 in a panel, the top faces 354 of the radial ribs 352 and 353 direct panel metal beneath both the inclined inner side wall 336 and the inclined outer side wall 340 providing improved push-off strength.

The second difference of the self-attaching nut 320 shown in FIGS. 16 and 17 is that the radial ribs 352 are integral with the outer wall 346 of the radial notches 344, but have a circumferential width less than the circumferential width of the radial notches measured between the opposed radial walls 348. As described above with regard to the embodiment of the self-attaching nut 20 shown in FIGS. 1 to 5, the side faces 358 of the radial ribs 352 and 353 are inclined outwardly from the top face 354 which, during installation of the self-attaching nut 320 in a panel (not shown), directs panel metal between the radial ribs 352 and the opposed radial walls 348. In a preferred embodiment of the self-attaching nut 320, the radial outer end of the radial notches 352 is spaced below the plane of the annular panel support face 330 at or above a midportion of the outer walls 346, such that the panel metal will fill the upper portion of the radial notches 344.

The self-attaching nut 320 shown in FIGS. 16 and 17 provide further advantages over the self-attaching nuts previously described. First, the alternating overlapping radial ribs 352 and 353 provide superior torque resistance over the previously described embodiments. Second, because the inclined top faces 358 of the radial ribs 352 and 353 alternate radially inwardly and outwardly toward the inner and outer side walls 336 and 340, respectively, more panel metal is driven beneath the inclined inner and outer side walls 336 and 340, providing improved push-off strength and balancing the forces resulting from the panel being driven against the radial ribs. Finally, forming the radial ribs 352 integral with the outer wall 346 of the radial notches 344 locates the radial ribs further from the axis of the bore 334, providing further torque resistance.

As set forth above, the self-attaching nut 320 shown in FIGS. 16 and 17 may otherwise be identical to the self-attaching nut 20 described above with regard to FIGS. 1 to 5 and have been numbered the same, except that the elements are numbered in the 300 series and therefore no further description is required for a complete understanding of this embodiment of the self-attaching nut of this invention.

The fifth embodiment of the self-attaching nut 420 of this invention shown in FIGS. 18 to 20 differs from the embodiment of the self-attaching nut 20 shown in FIGS. 1 to 5 in two material respects. As set forth above in the Background of the Invention, it is not desirable to utilize radial ribs which bridge the inner and outer side walls of the annular groove to avoid thread distortion. In the second preferred embodiments of the self-attaching nuts of this invention, the radial ribs are integral with either the inner or outer side walls of the annular groove, but spaced from the opposed wall, particularly where the radial ribs are integral with the outer side wall as described above with regard to the embodiments of the self-attaching nuts 20, 120, 220 and 320 described above. In the embodiment of the self-attaching nut 120 shown in FIGS. 6 to 10, the radial ribs 152 extend below the plane of the bottom wall 138 and are therefore not integral with the outer side wall of the pilot portion 126, further reducing the likelihood of thread distortion. In this fifth embodiment of the self-attaching nut 420, the radial ribs 452 extend to adjacent the inner side wall 436 of the annular groove 428 above the plane of the bottom wall 438 as best shown in FIG. 20. However, the radial ribs 452 further include circumferential channels 464 having opposed faces 466 which, in the disclosed embodiment, extend to the bottom wall 438 of the annular groove 428 as best shown in FIG. 20. Thus, the inwardly directed force during installation of this embodiment of the self-attaching nut 420 in a panel (not shown), the inward force of a panel against the top faces 254 is reduced, reducing the likelihood of distortion of the threads of the bore 434. It is also believed that this embodiment of the self-attaching nut 420 may provide further torque resistance because of the increased area of the side faces 458 of the radial ribs 452. The remaining features or elements of the self-attaching nut 420 shown in FIGS. 18 to 20 may be identical to the embodiment of the self-attaching nut 20 shown in FIGS. 1 to 5 and have therefore been numbered the same as the self-attaching nut 20 except that the self-attaching nut 420 is numbered in the 400 series. Therefore, no further description of the embodiment of the self-attaching nut 420 is necessary for a complete understanding of this embodiment.

Figure 21:
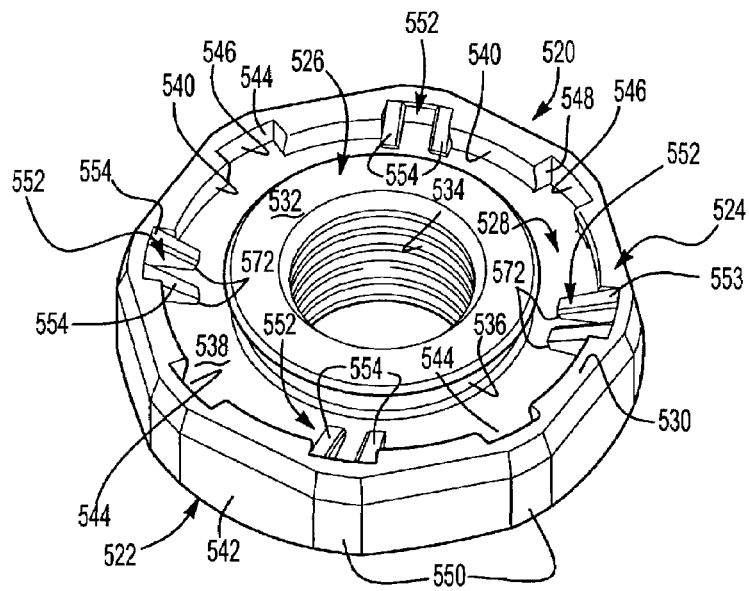
FIG. 21 is a top perspective view of a further alternative embodiment of the self-attaching nut of this invention.
Figure 22:
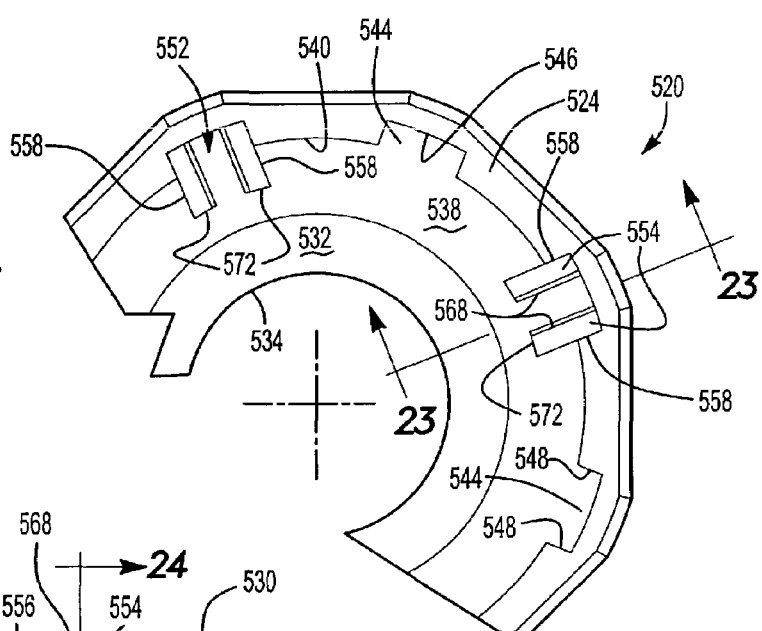
FIG. 22 is a partial top view of the self-attaching nut shown in FIG. 21.
Figure 23:
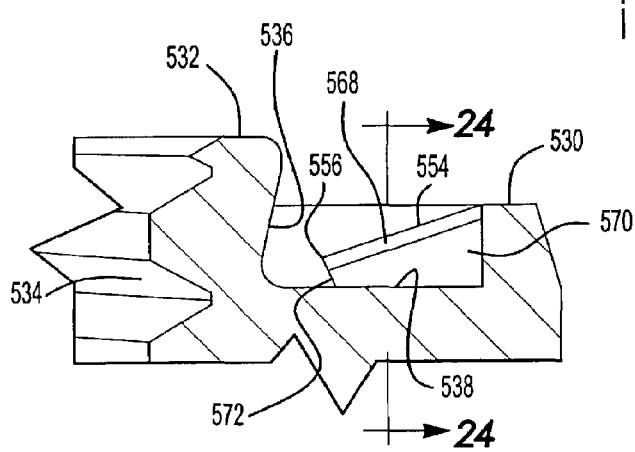
FIG. 23 is a partial cross-sectional view of FIG. 22 in the direction of view arrows 23—23.
Figure 24:
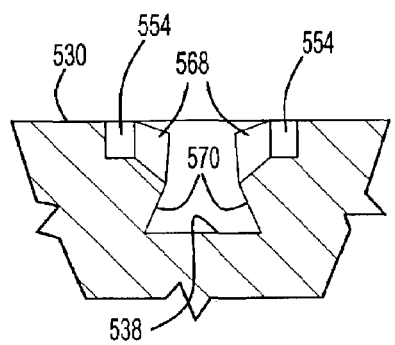
FIG. 24 is a partial cross-sectional view of FIG. 23 in the direction of view arrows 24—24.

The sixth embodiment of the self-attaching nut 520 shown in FIGS. 21 to 24 differs from the embodiments of the self-attaching nuts previously described in that a plurality of the circumferentially spaced radial notches 544 include a pair of circumferentially spaced radial ribs 552 and 553 integral with the outer wall 546 and one of the opposed radial walls 548 of the radial notches 544, as shown. In this embodiment, the radial ribs 552 and 553 each include a top face 554 which may extend to the panel support face 530 as shown in FIGS. 23 and 24 or spaced below the panel support face 530 as described above with the previous embodiments. The radial ribs 552 and 553 further include opposed outwardly inclined faces 568 and opposed inwardly inclined faces 570, wherein the inwardly inclined faces 570 form an undercut as shown in FIG. 24. Thus, during installation of the self-attaching nut 520 in a panel (not shown), the panel metal is deformed against the opposed outwardly inclined faces 568 and beneath the opposed inwardly inclined faces 570 against the bottom wall 538 of the annular groove. Further, the radial inner ends 556 of the radial ribs 552 and 554 are spaced above the plane of the bottom wall 538 of the annular groove 528 and include an inwardly inclined end face 572 as shown in FIG. 23. As shown in FIGS. 21 and 22, the radial ribs 552 and 553 are located in alternative radial notches 544. That is, four of the radial notches 544 include a pair of radial ribs 552 and 553 and the remaining four radial notches are clear or open as described above with regard to FIG. 1.

The sixth embodiment of the self-attaching nut 520 shown in FIGS. 21 to 24 and described above provides further advantages over the embodiments previously described. As will be understood by those skilled in this art, a die member (not shown) utilized to install the self-attaching nut 520 will include an annular lip portion as utilized for installing self-attaching nuts of this type and shown in the above-referenced patents. However, the annular lip may further include radial portions for receipt between each pair of radial ribs 552 and 553. Thus, during installation, panel metal is deformed between the radial ribs 552 and 553 against the opposed outwardly inclined faces 568 and beneath the opposed inwardly inclined faces 570, providing further improved torque retention and push-off strength. Further, as the panel metal is deformed against the bottom wall 538 of the annular groove 528, panel metal will be deformed beneath the inwardly inclined end faces 572 of the radial ribs 552 and 553, providing further improved push-off strength. Finally, the increased area, of the side faces 558 and the location of the radial ribs integral with the outer wall 546, provides further improved torque resistance. This increased torque resistance reduces the required number of radial ribs. All other elements or features of the self-attaching nut 520 may be identical to the self-attaching nuts previously described and the reference numbers are identical to the previously described self-attaching nuts, except that the reference numbers are in the 500 series. That is, the self-attaching nut 520 includes a central pilot portion 526 having a bore 534 therethrough, an annular groove 528 surrounding the pilot portion 526 and an annular panel support face 530 surrounding the annular groove 528.

Figure 25:
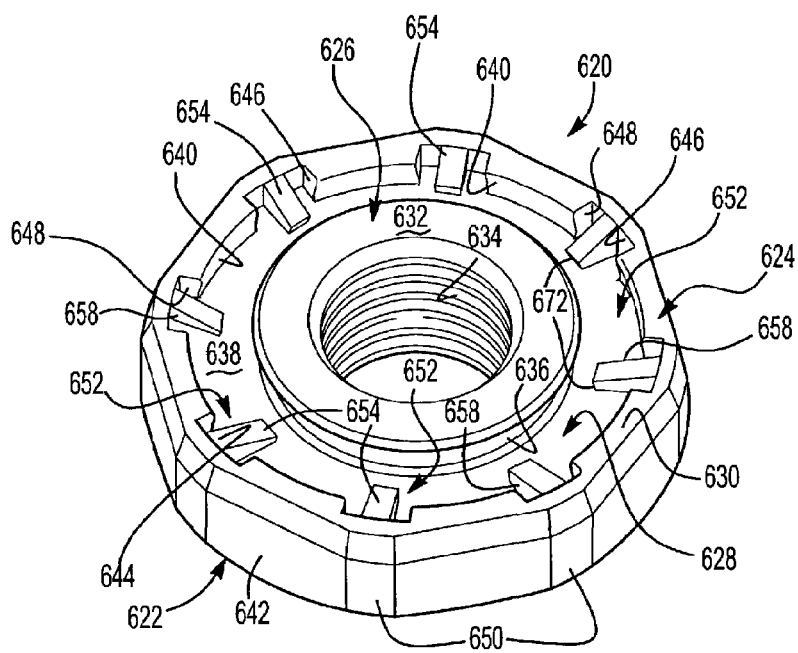
FIG. 25 is a top perspective view of a further alternative embodiment of the self-attaching nut of this invention.
Figure 26:
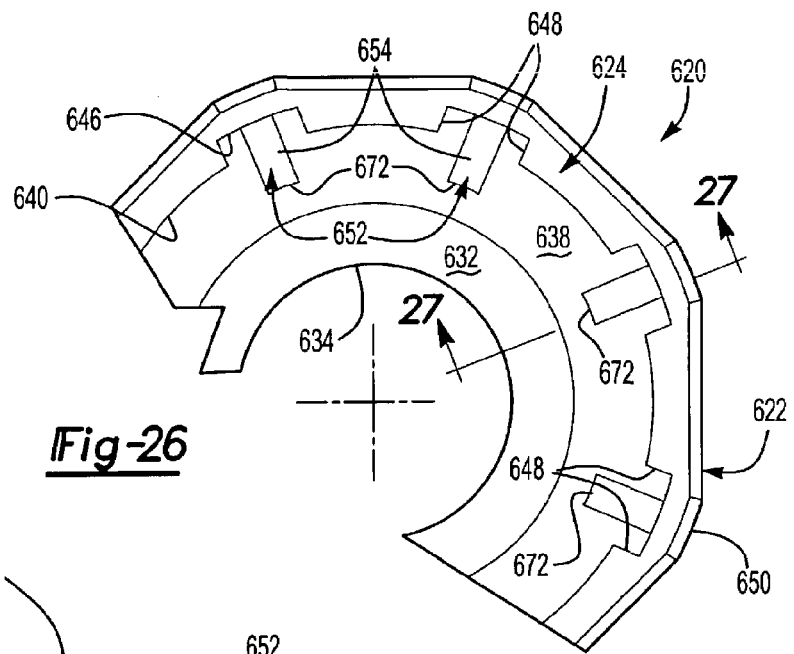
FIG. 26 is a partial top view of the self-attaching nut shown in FIG. 25.
Figure 27:
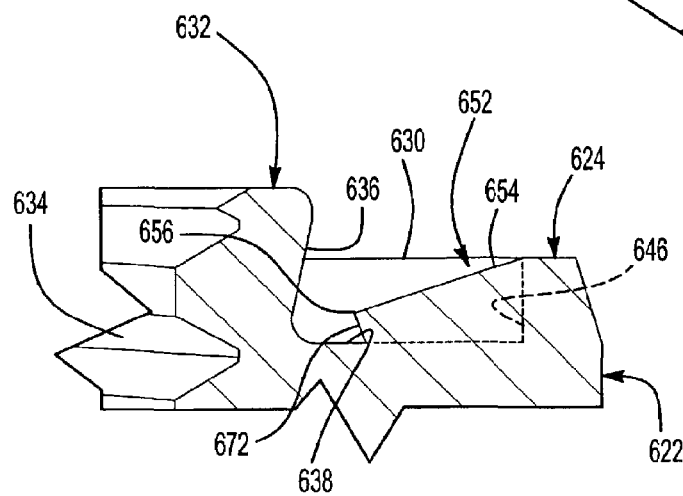
FIG. 27 is a partial cross-sectional view of FIG. 26 in the direction of view arrows 27—27.

Finally, the seventh embodiment of the self-attaching nut 620 shown in FIGS. 25 to 27 differs from the embodiment of the self-attaching nut 520 shown in FIGS. 21 to 24 in that each of the radial notches 644 includes only one radial rib 652 integral with the outer wall 646 of the radial notches 644, generally equally spaced between the radial walls 648. That is, in the embodiment of the self-attaching nut 620 shown in FIGS. 25 to 27, each of the radial notches 644 includes a radial rib 652 integral with the outer wall 646 of the radial notches having a circumferential width less than the circumferential width of the radial notches 644 measured between the opposed radial walls 648, wherein the radial ribs 652 extend to the panel support face 630 as shown in FIG. 27 and the radial inner ends 656 of the radial ribs 652 is spaced above the plane of the bottom wall 638 of the annular groove 628 and the radial ribs 652 each include inwardly inclined end faces 672 as shown in FIG. 27. As will be understood, however, the radial ribs 652 may also have a width equal to the width of the notches 644. Except as described above, the self-attaching nut 620 may be identical to the embodiment of the self-attaching nut 520 and the previously described embodiments and therefore the self-attaching nut 620 is numbered the same, except that the reference numbers are in the 600 series.

During installation of the seventh embodiment of the self-attaching nut 620 shown in FIGS. 25 to 27 in a panel (not shown), panel metal is deformed against the bottom wall 638 and the inwardly inclined top faces 654 of the radial ribs 652. The top faces 654 of the radial ribs 652 then deform the panel metal radially inwardly beneath the inclined inner side wall 636 and beneath the inwardly inclined end faces 672 providing improved push-off strength. The panel metal is further deformed circumferentially against the inclined side faces 658 into the radial notches 644 and against the side faces 658 to the bottom wall 638 of the annular groove 628. Because the side faces 658 of the radial ribs 652 have a greater surface area, the radial ribs 652 provide greater torque resistance than where the radial ribs extend to a midportion of the outer wall.

As will now be understood from the above description of the embodiments of the self-attaching nut of this invention, the improvements in torque resistance and push-off strength provided by the various embodiments of the self-attaching nuts disclosed herein may be utilized individually or in combination to provide improved torque resistance and push-off strength. In the preferred embodiments, the radial ribs are integral with either the inner or outer side walls of the annular groove and the radial inner ends of the radial ribs are preferably spaced from the opposed side wall. In the more preferred embodiments, the radial ribs are integral with the outer wall of the annular groove, but may be integral with either the inclined outer side wall of the annular groove or the outer wall of the radial notches which, in a preferred embodiment, extends generally perpendicular to the panel support face surrounding the annular pilot. However, as set forth above, the outer wall of the radial notches, when utilized, forms the outer side wall of the annular groove and thus, as used herein, reference to the radial notches as integral with the outer side wall includes radial notches integral with the outer wall of the radial notches. In a preferred embodiment, the outer side wall of the annular groove is inclined toward the pilot portion and the inner side wall of the annular groove is inclined toward the outer side wall, forming a dovetail-shaped annular groove providing improved push-off strength. In the disclosed embodiments of the self-attaching nuts, the bottom wall of the annular groove extends generally perpendicular to the axis of the bore through the pilot portion. However, the bottom wall may also be inclined toward either the inner or outer side wall of the annular groove. Further, as will be understood by those skilled in this art, the bottom wall must be inclined toward either the inner or outer side wall of the annular groove a few degrees to permit removal of the self-attaching nut from a die member used to form the annular groove. This would be true of any self-attaching nut of this type.

As set forth above, the embodiments of the self-attaching nuts described above may be utilized as either a pierce or clinch nut. In either method of installation, the metal panel is supported in a die press on a die member or die button. The die button includes an annular clinching lip configured to be received in the annular groove generally having outwardly tapered surfaces as is known in this art. In a conventional application, the die button is located in the lower die shoe of a die press and the self-attaching nut is received in an installation head located in the upper die shoe having a reciprocating plunger which drives the self-attaching nut against the panel. Where the self-attaching nut is utilized as a pierce nut, the end face of the pilot portion pierces or punches an opening in the panel and the annular lip of the die button deforms the panel metal into the annular groove and against the bottom wall of the groove as is known in this art. Where the self-attaching nut is utilized as a clinch nut, an opening is preformed in the panel configured to receive the pilot portion therethrough and the annular lip of the die member then deforms the panel metal into the re-entrant groove and against the bottom wall in the same manner as described.

As will be understood by those skilled in this art, various modifications may be made to the embodiments of the self-attaching nut described above and shown in the attached drawings within the purview of the appended claims. For example, the features of the embodiments disclosed herein may be utilized alone or in combination as set forth above. More specifically, the radial notches may be utilized without the radial ribs and vice versa depending upon the requirements of the application. However, the preferred embodiments of the self-attaching nut includes radial notches in combination with one of the embodiments of the radial ribs disclosed herein. In the more preferred embodiments, the radial ribs are generally equally circumferentially spaced and integral with either the inner or outer side walls of the annular groove and spaced from the opposed side wall to reduce deformation of the thread cylinder of the bore through the pilot portion. Further, the bore may be unthreaded to receive a self-tapping or thread rolling male fastener. In the more preferred embodiments, the annular groove includes an inner wall inclined toward the outer wall of the annular groove and an outer wall inclined toward the pilot portion and the outer wall includes radial ribs integral with the outer wall of the annular groove, either integral with the inclined outer side wall or the outer wall of the radial notches. The outer wall of the radial notches may be perpendicular to the panel support face, as disclosed in the embodiments illustrated in the drawings, or the outer wall of the radial notches may be inclined, preferably toward the pilot portion. Alternatively, the radial ribs may be integral with the inner wall of the annular groove or the pilot portion or more preferably the self-attaching nut may include alternating circumferentially spaced radial ribs integral with the pilot portion and the outer wall of the annular groove as shown, for example, in FIGS. 16 and 17. Further, in the preferred embodiments, the bottom wall of the annular groove is generally perpendicular to the axis of the bore through the pilot portion or parallel to the panel support face. However, the bottom wall may also be angled inwardly toward the pilot portion. As will be understood by those skilled in this art, however, the bottom wall will generally be inclined toward the pilot portion about one to three degrees to permit removal of the self-attaching nut from the die member of the cold header following formation of the self-attaching nut of this invention. In the preferred embodiments of the self-attaching nut of this invention, the radial ribs are integral with either the inner or outer side walls of the annular groove at or above a midportion of the side wall. Having described several preferred embodiments of the self-attaching nut of this invention, the invention is now claimed as follows.

What is claimed is:

1. A self-attaching nut for attachment to a panel, comprising: a body portion having an end face, a central pilot portion projecting from said end face of said body portion having a bore therethrough, an annular groove in said end face of said body portion surrounding said pilot portion and an annular panel support face surrounding said annular groove, said annular groove including an inner side wall adjacent said pilot portion, a bottom wall and an outer side wall extending to said annular panel support face, and a plurality of spaced radial ribs integral with one of said inner and outer side walls of said annular groove having a top face inclined to said bottom wall and continuing below said bottom wall in a radial channel formed in said bottom wall of said annular groove.

2. The self-attaching nut as defined in claim 1, wherein said outer side wall of said annular groove includes a plurality of spaced notches.

3. The self-attaching nut as defined in claim 2, wherein said plurality of spaced notches each include an outer wall extending from said bottom wall of said annular groove to said annular panel support face and opposed side walls.

4. The self-attaching nut as defined in claim 1, wherein said inner side wall of said annular groove is inclined toward said outer side wall and said radial ribs are integral with said outer side wall of said annular groove.

5. The self-attaching nut as defined in claim 4, wherein said outer side wall of said annular groove is inclined toward said pilot portion.

6. The self-attaching nut as defined in claim 1, wherein said plurality of spaced radial ribs are integral with said outer side wall of said annular groove, spaced at or above a midportion of said outer side wall.

7. The self-attaching nut as defined in claim 6, wherein said inner side wall of said annular groove is inclined outwardly from said bottom wall toward said end face of said body portion.

8. The self-attaching nut as defined in claim 1, wherein said spaced radial ribs are circumferentially spaced and integral with said outer side wall of said annular groove and extend radially toward an axis of said central pilot portion.

9. The self-attaching nut as defined in claim 1, wherein said radial ribs are integral with said one of said inner and outer side walls above a plane of said bottom wall of said annular groove.

10. The self-attaching nut as defined in claim 1, wherein said top face of said spaced radial ribs is planar.

11. The self-attaching nut as defined in claim 10, wherein said spaced radial ribs each include side faces extending to said bottom wall of said annular groove inclined outwardly from said top face.

12. The self-attaching nut as defined in claim 1, wherein said outer side wall of said annular groove is inclined inwardly from said bottom wall toward said pilot portion and said inner side wall of said annular groove is inclined outwardly from said bottom wall toward said end face of said body portion.

* * * * *